Patented Nov. 17, 1942

2,301,964

UNITED STATES PATENT OFFICE 2,301,964

METHOD OF PREPARING LACTAMS

Elmore Louis Martin, Wilmington, Del., assignor to E. I. du Pont de Nemours & Company, Wilmington, Del., a corporation of Delaware No Drawing. Application September 12, 1941, Serial No. 410,585

14 Claims. (Cl. 260—239)

This invention relates to the production of lactams, and more particularly to their production from aminonitriles and water.

Caprolactam, one of the products of the present invention, has heretofore been prepared by contacting a gaseous mixture of cyclohexanone oxime and ammonia with a dehydration catalyst. This method of preparation is shown in U. S. Patent 2,234,566.

It is an object of this invention to provide a simple, liquid-phase method of producing lactams. Another object is to prepare caprolactam from epsilon-aminocapronitrile. It is a further object to provide a method for the liquid-phase hydrolysis of nitriles. A still further object is to provide a process for the continuous hydrolysis of nitriles.

These and other objects are accomplished according to this invention which comprises heating in the liquid phase to lactamizing temperatures for a period of time insufficient for substantial polymer formation, a weak aqueous solution of an aminonitrile having at least one hydrogen atom directly bonded to an amino nitrogen atom and which is capable of forming rings containing not more than 8 atoms. The structural formula of suitable aminonitriles is R'NH.R.CN, wherein R is a divalent organic radical of not more than 6 atoms which may in turn be further substituted, and R' is hydrogen or a univalent hydrocarbon radical.

As illustrative of aminonitriles which can be employed, the following are named:

$H_2N—CH_2—CN$ (amino acetonitrile);

$\overset{CH_3}{\underset{|}{HN}}—(CH_2)_3—CN$ (N-methyl-4-amino butyronitrile)

$H_2N—(CH_2)_3—CN$ (4-amino butyronitrile);
$H_2N—(CH_2)_4—CN$ (5-amino valeronitrile);

$\overset{C_2H_5}{\underset{|}{HN}}—(CH_2)_4—CN$ (N-ethyl-5-amino-valeronitrile)

$H_2N—(CH_2)_2OCH_2CN$ (2-(aminoethoxy) acetonitrile); $H_2N—(CH_2)_3S—(CH_2)—CN$ (3-(aminopropyl) acetonitrile sulfide);

$H_2N—(CH_2)_2—C_6H_4—CH_2—CN$ (o-(2-aminoethyl) benzyl cyanide);

$H_2N—CH_2—C_6H_4—CN$ (o-cyanobenzylamine); $H_2N—C_6H_4—CH_2—CN$ (o-aminobenzylcyanide);

$H_2NC_6H_4—O—(CH_2)_2—CN$ (o-(2-cyanoethoxy) phenylamine); and $CH_3—NH—CH_2—C_6H_4CN$ (o-cyano-N-methylbenzylamine). Aliphatic aminonitriles are especially well adapted for use. The preferred aminonitrile is epsilon-aminocapronitrile.

It has been found that hydrolysis and concurrent lactam formation proceed rapidly when the aminonitrile is reacted in a weak aqueous solution. While the invention is not limited to any theory as to the reaction mechanism, it appears that the following chemical reactions occur:

The following reaction leads to undesired high molecular by-products, and is repressed by employing a short heating period and a weak aqueous solution:

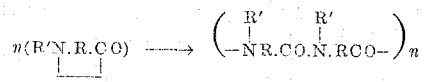

By employing an aqueous solution containing not more than about 30% by weight of the selected aminonitrile, and preferably from about 10 to 25% by weight of aminonitrile, it has been found that undesired side reactions and polymer formation are greatly reduced. The formation of the desired lactam thus proceeds smoothly and rapidly.

In the reaction of the selected aminonitriles with water, temperatures of from about 200° C. to about 375° C. are suitable. It is generally preferred to employ temperatures within the more restricted range of 250° to 290° C.

The reaction is carried out under a pressure sufficient to maintain the reactants in the liquid phase. While the operating pressure is not a critical feature of this invention so long as the reactants are maintained in the liquid phase, it has been found that a pressure of 1300 to 1400 lbs. per sq. in. is satisfactory. It will be apparent that the exact pressure required to keep the reactants in the liquid phase will vary considerably, depending upon the temperature employed and the particular aminonitrile being reacted.

The time during which the aminonitrile and water are to be maintained at reaction temperature is relatively short, being not more than about one hour. Preferably, the reaction time is only about 10 to 30 minutes. The presence of hydrogen sulfide in the reaction mixture is desirable since it catalyzes the lactamization of the aminonitrile, and when recycling the reactants, as hereinafter more fully explained, the reaction time per pass is maintained at from about 10 to 30 minutes. It is important that the reaction time be maintained at less than about one hour, since undesired polymer formation and side reactions are encouraged by extended heating. On the other hand, the reaction time may be reduced to as little as five minutes with some conversion to lactam resulting.

Any of the usual construction materials not corroded by alkalis or amines can be employed for the reaction apparatus. Stainless steel is the preferred material of construction but nickel-lined or enameled equipment is also satisfactory.

In the hydrolysis of aminonitriles, with concurrent lactam formation, large amounts of ammonia are set free. The liberated ammonia tends to inhibit further reaction, and its removal at an intermediate point is therefore desirable. This may be accomplished in one modification of the present invention, by lowering the pressure to atmospheric, after one passage through the reactor, and heating under reflux to expel the liberated ammonia. Thereafter the solution is again passed through the reactor in the liquid phase at reaction temperatures, whereby a further increase in the yield of lactam is secured. In continuous operation, two or more reactors in series with provisions for intermediate pressure let-down and refluxing at atmospheric pressure or less may be used to accomplish intermediate ammonia removal.

By the method of this invention yields of lactam approaching quantitative proportions can be obtained by operating the process as a cyclic operation in which the reaction mixture, after separation of the lactam formed, is returned to the reaction zone either alone or after mixing with fresh aminonitrile. If desired, impurities may be removed from the aqueous solution by extracting with ether prior to vacuum distillation. Epsilon-aminocapronitrile, one of the preferred raw materials, boils at 75° C. under 2 mm. pressure. Epsilon-caprolactam, its reaction product boils at 112° to 113° C. at 5 mm. pressure, and may be recrystallized from petroleum ether. It melts sharply at 68–69° C.

Especially advantageous results are obtained by operating the process continuously. The weak aqueous solution is continuously passed in the liquid phase through the reaction zone, the ammonia is continuously expelled by reflux distillation, and thereafter the formed lactam is separated by vacuum distillation. The lactam-free reaction mixture is then, after addition of make-up water, returned to the hydrolysis reactor.

The following examples illustrate the preferred embodiment of the invention, but the invention is not to be restricted thereto.

*Example 1.*—An aqueous solution of 40 grams epsilon-aminocapronitrile (neutral equivalent 112.0) and 160 grams distilled water is passed continuously in the liquid phase through 10 feet of 1/8 inch × 1/4 inch stainless steel tubing heated in a metal bath maintained at 275 to 280° C. The pressure is maintained at a point sufficiently high to keep the reactants in the liquid phase, and the solution is passed through the tube at a rate of 0.4 cubic centimeter per minute, the contact time being approximately 27 minutes. Upon refluxing to expel the ammonia, and subsequent vacuum distillation, 24 grams of epsilon-caprolactam is obtained from the reaction mixture.

*Example 2.*—A solution of 15 grams of epsilon-aminocapronitrile (neutral equivalent 112.0) in 85 grams of distilled water is passed in a continuous manner in the liquid phase through 25 feet of 1/8 inch × 1/4 inch stainless steel tubing heated in a metal bath maintained at 285° C., at a rate of 2 cubic centimeters per minute, the reaction time being about 25 minutes. Two hundred five grams of the reaction mixture is refluxed to expel ammonia, concentrated under reduced pressure on the steam bath and the residue distilled under reduced pressure. There is obtained 23.5 grams of epsilon-caprolactam, melting at 63° to 66° C. and 7 grams of residue remain in the flask.

*Example 3.*—A 15% aqueous solution of epsilon-amino-capronitrile is treated as described in Example 2 and a yield of approximately 70% is secured without recycling the lactam-free reaction mixture.

*Example 4.*—An aqueous solution of 300 grams epsilon-aminocapronitrile, 1200 grams distilled water and 9.5 grams hydrogen sulfide is passed through the reaction tube described in Example 2 at the rate of 3.5 cubic centimeters per minute, the contact time being about 15 minutes. Epsilon-caprolactam is obtained in 60% yield by vacuum distillation of the reaction mixture.

*Example 5.*—A mixture of 500 grams epsilon-aminocapronitrile and 2000 grams distilled water is passed through the reaction tube described in Example 2 at the rate of 3 cubic centimeters per minute, the contact time being about 17 minutes. 2430 parts of the reaction mixture is boiled until substantially free of liberated ammonia, the concentrate made up to 2400 parts by the addition of water, and recycled to the reactor at the rate of 2.5 cubic centimeters per minute, the recycle reaction time being about 20 minutes. By concentrating the recycled reaction mixture on a steam bath, and vacuum distilling under reduced pressure, epsilon-caprolactam is recovered in a high yield, approximating 60% of the theoretical.

The lactams provided according to this invention are suitable for the preparation of polymers of the linear polyamide type, and indeed the reaction mixture may be utilized for that purpose without intermediate purification if it is desired to do so.

It will be apparent from a consideration of the foregoing that a convenient and continuous method has been provided for the hydrolysis of aminonitriles, and the formation therefrom of lactams. It will also be apparent that various changes and modifications may be made without departing from the spirit and scope of the invention or sacrificing any of its advantages.

What is claimed is:

1. A lactam manufacturing process which comprises heating, in liquid phase to lactamizing temperature for a period of time insufficient for substantial polymer formation, a weak aqueous solution of an aminonitrile having at least one hydrogen atom directly bonded to an amino nitrogen atom.

2. A lactam manufacturing process which comprises heating in liquid phase to lactamizing temperature for not more than about one hour, a weak aqueous solution of an aliphatic aminonitrile having at least one hydrogen atom directly bonded to an amino nitrogen atom.

3. A lactam manufacturing process which comprises heating to a temperature of from about 200° C. to about 375° C. in the liquid phase for a period of time insufficient for substantial polymer formation, a weak aqueous solution of an aliphatic aminonitrile having at least one hydrogen atom directly bonded to an amino nitrogen atom.

4. A lactam manufacturing process which comprises heating, in liquid phase to lactamizing temperature for a period of time insufficient for substantial polymer formation, an aqueous solution containing not more than about 30% by weight of an aliphatic aminonitrile having at least one hydrogen atom directly bonded to an amino nitrogen atom.

5. A lactam manufacturing process which comprises heating in liquid phase to a temperature of from about 200° C. to about 375° C. for not more than about one hour, an aqueous solution containing not more than about 30% by weight of an aliphatic aminonitrile having at least one hydrogen atom directly bonded to an amino nitrogen atom.

6. The process which comprises passing in liquid phase a weak aqueous solution of an aliphatic aminonitrile having at least one hydrogen atom directly bonded to an amino nitrogen atom through a closed reaction vessel heated to lactamizing temperature, the said solution remaining in the reaction vessel for not more than about one hour, distilling the reacted solution to remove formed ammonia, separating the produced lactam and returning the lactam-free reaction mixture to reaction as before.

7. The process which comprises passing in liquid phase an aqueous solution containing not more than about 30% by weight of an aliphatic aminonitrile having at least one hydrogen atom directly bonded to an amino nitrogen atom through a closed reaction vessel heated to a temperature of from about 200° C. to about 375° C., the said solution remaining in the reaction vessel for not more than about one hour, distilling the reacted solution at atmospheric pressure to remove ammonia, separating the lactam produced, and thereafter returning the lactam-free reaction mixture to reaction as before.

8. The process which comprises passing in liquid phase a weak aqueous solution of epsilon-aminocapronitrile through a closed reaction vessel heated to lactamizing temperature, the said solution remaining in the reaction vessel for a time insufficient for substantial polymer formation, distilling the reacted solution at atmospheric pressure to remove aqueous ammonia, separating the lactam formed, and thereafter recycling the lactam-free reaction mixture.

9. The process which comprises passing in liquid phase an aqueous solution containing not more than about 30% by weight of epsilon-aminocapronitrile through a closed reaction vessel heated to a temperature of from about 200° C. to about 375° C., the said solution remaining in the reaction vessel for not more than about one hour, passing the reacted solution into an atmospheric pressure distillation vessel whereby ammonia is removed, separating the lactam formed, recycling the lactam-free reaction mixture, and then separating a residue containing the produced lactam.

10. A lactam manufacturing process which comprises heating, in liquid phase to lactamizing temperature for a period of time insufficient for substantial polymer formation, a weak aqueous solution of epsilon-aminocapronitrile.

11. A lactam manufacturing process which comprises heating, in liquid phase to lactamizing temperature for not more than about one hour, an aqueous solution containing not more than about 30% by weight of epsilon-aminocapronitrile.

12. An epsilon-caprolactam manufacturing process which comprises introducing into a closed reaction vessel an aqueous solution containing not more than about 30% by weight of epsilon-aminocapronitrile, maintaining in the reaction vessel a temperature of 200° C. to 375° C. and a pressure sufficient to insure that the reactants are in the liquid phase, allowing the reaction to continue for not more than about one hour, withdrawing the reaction products, and separating epsilon-caprolactam therefrom.

13. The process which comprises passing a 15% aqueous solution of epsilon-aminocapronitrile in the liquid phase through a stainless steel reaction tube heated to about 285° C. at such a rate that the reactants remain in the tube for about 25 minutes, withdrawing the reaction products, refluxing the liquid residue to expel the formed ammonia, and separating epsilon-caprolactam from the concentrate.

14. The process which comprises passing in liquid phase, a solution of about 500 parts by weight of epsilon-aminocapronitrile in about 2000 parts by weight of water, through a stainless steel reaction tube heated to about 285° C. at such a rate that the reactants remain in the tube for about 17 minutes, cooling the reactants, refluxing to expel formed ammonia, and recycling the ammonia-free concentrate through the said reaction tube as before, whereby the yield of epsilon-caprolactam is increased, and separating epsilon-caprolactam from the reaction mixture.

ELMORE LOUIS MARTIN.